United States Patent
Kao et al.

(10) Patent No.: US 12,194,558 B2
(45) Date of Patent: *Jan. 14, 2025

(54) ELECTRICAL DISCHARGE MACHINING METHOD FOR GENERATING VARIABLE SPRAY-HOLE GEOMETRY

(71) Applicant: Cummins Inc., Columbus, IN (US)

(72) Inventors: Chen-Chun Kao, Columbus, IN (US); John K. Awad, Columbus, IN (US); Steven Valentin, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/180,205

(22) Filed: Mar. 8, 2023

(65) Prior Publication Data

US 2023/0219154 A1    Jul. 13, 2023

Related U.S. Application Data

(63) Continuation of application No. 15/769,990, filed as application No. PCT/US2016/058242 on Oct. 21, 2016, now Pat. No. 11,602,798.

(Continued)

(51) Int. Cl.
*B23H 7/20* (2006.01)
*B23H 1/02* (2006.01)
(Continued)

(52) U.S. Cl.
CPC .............. *B23H 7/20* (2013.01); *B23H 1/02* (2013.01); *B23H 7/265* (2013.01); *B23H 9/14* (2013.01);
(Continued)

(58) Field of Classification Search
CPC ... B23H 7/20; B23H 1/02; B23H 9/14; B23H 7/265; B23H 9/16
See application file for complete search history.

(56) References Cited

U.S. PATENT DOCUMENTS 3,793,169 A    2/1974  Joslin
4,691,089 A    9/1987  Balleys
(Continued)

FOREIGN PATENT DOCUMENTS

CN    105618875    6/2016
EP     1541271     6/2005
(Continued)

OTHER PUBLICATIONS

First Notification of Office Action issued by the China National Intellectual Property Administration (English Translation Attached), dated Oct. 8, 2019, for related Chinese Application No. 201680061577.0; 20 pg.

(Continued)

*Primary Examiner* — Geoffrey S Evans
(74) *Attorney, Agent, or Firm* — Taft, Stettinius & Hollister LLP (57) ABSTRACT

A method is provided comprising identifying an alignment point of a workpiece; positioning a first end of an electrode in the direction of the alignment point of the workpiece; applying a first voltage to the electrode wherein the applied first voltage generates a spark; rotating the electrode in a first direction; advancing the electrode toward the alignment point by a first distance wherein advancing the electrode and applying the first voltage creates a first orifice section; applying a second voltage to the electrode and modifying one or more operational parameters of the electrode; advancing the electrode toward the alignment point by a second distance wherein advancing the electrode and applying the second voltage causes formation of at least a second orifice section; wherein the first and second orifice sections cooperate to form an orifice comprising a first flow area and a second flow area.

20 Claims, 6 Drawing Sheets

Related U.S. Application Data (60) Provisional application No. 62/245,649, filed on Oct. 23, 2015.

(51) Int. Cl.
  *B23H 7/26* (2006.01)
  *B23H 9/14* (2006.01)
  *B23H 9/16* (2006.01)
  *B23H 9/00* (2006.01)

(52) U.S. Cl.
  CPC .................. *B23H 9/16* (2013.01); *B23H 9/00* (2013.01); *B23H 2200/20* (2013.01); *G05B 2219/45221* (2013.01)

(56) References Cited

U.S. PATENT DOCUMENTS

| | | | |
|---|---|---|---|
| 4,852,232 | A | 8/1989 | Wells |
| 5,016,820 | A | 5/1991 | Gaskell |
| 6,644,565 | B2 | 11/2003 | Hockenberger |
| 6,717,094 | B2 | 4/2004 | Beaumont |
| 7,009,134 | B2 | 3/2006 | Aurich et al. |
| 7,572,997 | B2 | 8/2009 | Kao et al. |
| 8,544,770 | B2 | 10/2013 | Limmer et al. |
| 11,602,798 | B2 * | 3/2023 | Kao .................. B23H 1/02 |
| 2002/0113042 | A1 | 8/2002 | Masaki et al. |
| 2004/0200807 | A1 | 10/2004 | Forrester et al. |
| 2005/0133378 | A1 | 6/2005 | Glock et al. |
| 2008/0203069 | A1 | 8/2008 | Kao et al. |
| 2013/0043009 | A1 * | 2/2013 | Bunker .................. F01D 25/28 |
| | | | 165/104.34 |

FOREIGN PATENT DOCUMENTS

| | | |
|---|---|---|
| EP | 1840368 | 10/2007 |
| GB | 2138340 | 4/1983 |
| SU | 430980 | 6/1974 |

OTHER PUBLICATIONS

International Preliminary Report on Patentability dated Dec. 26, 2017 in PCT/US2016/058242; 7 pgs.

International Search Report and Written Opinion dated Jan. 19, 2017 in PCT/US2016/058242; 9 pgs.

Second Notification of Office Action issued by the China National Intellectual Property Administration (English Translation Attached), dated Jun. 18, 2020, for related Chinese Application No. 201680061577.0; 19 pg.

* cited by examiner

ELECTRICAL DISCHARGE MACHINING METHOD FOR GENERATING VARIABLE SPRAY-HOLE GEOMETRY

RELATED APPLICATIONS

The present application is a continuation of U.S. patent application Ser. No. 15/769,990, filed Apr. 20, 2018 which is a national phase filing under 35 U.S.C. § 371 of International Application No. PCT/US2016/058242, titled "ELECTRICAL DISCHARGE MACHINING METHOD FOR GENERATING VARIABLE SPRAY-HOLE GEOMETRY," filed on Oct. 21, 2016, which claims the benefit of priority to provisional application No. 62/245,649, filed with the United Patent and Trademark Office on Oct. 23, 2015, the entire disclosures of which being expressly incorporated herein by reference.

FIELD OF THE DISCLOSURE

The present disclosure generally relates to a method for generating spray-hole geometries, and more specifically to a method that utilizes Electrical Discharge Machining to generate a spray-hole geometry having a venturi and/or a converge-diverge spray-hole design.

BACKGROUND OF THE DISCLOSURE

Electrical Discharge Machining ("EDM") is a process by which conductive particles are removed from the surface of a positively charged workpiece by a series of discharges emanating from a negatively charged electrode. The electrical discharges or sparks create micro-craters on the workpiece by removing material along the cutting path through melting and vaporization. EDM is typically used to create very small and precise holes having generally straight walls. One common application for EDM is in the fabrication of fuel injector nozzles having one or more injection orifices. The introduction of fuel into the cylinders of an internal combustion engine is most commonly achieved using fuel injectors. Internal combustion engine designers have increasingly come to realize that substantially improved fuel supply systems are required in order to meet the ever increasing governmental and regulatory requirements of emissions abatement and increased fuel economy.

As such one aspect of fuel supply systems that has been the focus of designers is the need to produce fuel injector nozzles having one or more injection orifices or spray-holes comprising a venturi and/or converge-diverge spray-hole design. If such goals are to be attained fuel injector orifice design methods must evolve to yield reliable and repeatable processes for generating accurate venturi injection orifices. Fuel injectors with variable geometry injection orifices such as venturi or converge-diverge spray-hole designs have been studied extensively in educational institutions and the venturi design is believed to benefit the fuel injection and fuel atomization processes. Due to the high capital costs of laser drilling technology, a new EDM method is desired which has the potential to produce accurately designed venturi injection orifices and to increase the life span of current EDM machines utilized in the fuel injector design and manufacturing process. Accordingly, it is desirable to develop an injection orifice design method that utilizes EDM to generate a spray-hole geometry having a venturi and/or a converge-diverge spray-hole design.

SUMMARY OF THE DISCLOSURE

In one embodiment of the present disclosure, a method is provided comprising identifying an alignment point of a workpiece: positioning, by a controller, a first end of an electrode in the direction of the alignment point of the workpiece: applying a first voltage, by the controller, to the electrode wherein the applied first voltage generates a spark: rotating, by the controller, the electrode in a first direction; advancing, by the controller, the electrode toward the alignment point by a first distance wherein advancing the electrode and applying the first voltage creates a first orifice section: applying, by the controller, a second voltage to the electrode and modifying one or more operational parameters of the electrode; and advancing, by the controller, the electrode toward the alignment point by a second distance wherein advancing the electrode and applying the second voltage causes formation of at least a second orifice section, wherein the first orifice section and the second orifice section cooperate to form at least a portion of an orifice comprising a first flow area and a second flow area wherein the first flow area is greater than the second flow area. In one example the second voltage is greater than the first voltage. Optionally, the second distance is greater than the first distance.

The method can include, additionally or alternately, applying, by the controller, a third voltage to the electrode and modifying one or more operational parameters of the electrode: advancing, by the controller, the electrode toward the alignment point by a third distance wherein advancing the electrode and applying the third voltage causes formation of at least a third orifice section: applying, by the controller, a fourth voltage to the electrode and modifying the one or more operational parameters of the electrode; and advancing, by the controller, the electrode toward the alignment point by a fourth distance wherein advancing the electrode and applying the fourth voltage causes formation of at least a fourth orifice section, wherein the third orifice section and the fourth orifice section cooperate to form at least a second portion of the orifice comprising a third flow area and a fourth flow area. In one example the fourth flow area is greater than the third flow area. Additionally or alternatively, the fourth voltage is greater than the third voltage. Optionally, the fourth distance is greater than the third distance.

In another embodiment of the present disclosure, a method is provided comprising identifying an alignment point of a workpiece: commanding a guide assembly to position a first end of an electrode in the direction of the alignment point of the workpiece; commanding a logic circuit to apply a first voltage to the electrode wherein the applied voltage generates a spark: commanding the guide assembly to rotate the electrode in a first direction: commanding the guide assembly to advance the electrode toward the alignment point by a first distance wherein advancing the electrode and applying the first voltage creates a first orifice section: commanding the logic circuit to apply at least a second voltage to the electrode and to modify one or more operational parameters of the electrode; and commanding the guide assembly to advance the electrode toward the alignment point by a second distance wherein advancing the electrode and applying the second voltage creates at least a second orifice section.

Additionally or alternatively, the method comprises commanding the logic circuit to apply a third voltage to the electrode and to modify the one or more operational parameters of the electrode: commanding the guide assembly to advance the electrode toward the alignment point by a third distance wherein advancing the electrode and applying the third voltage creates at least a third orifice section: commanding the logic circuit to apply a fourth voltage to the electrode and modifying the one or more operational parameters of the electrode; and commanding the guide assembly to advance the electrode toward the alignment point by a fourth distance wherein advancing the electrode and applying the fourth voltage creates at least a fourth orifice section.

For example, the first orifice section and the second orifice section can form at least a portion of an outlet section of the orifice. The third orifice section can form at least a portion of a middle section of the orifice. The fourth orifice section can form at least a portion of an inlet section of the orifice. In one example, the portion of the outlet section and the portion of the inlet section form a venturi shape. A diameter of the outlet section of the orifice can have a diameter greater than a diameter of the middle section of the orifice. Likewise, a diameter of the inlet section of the orifice can have a diameter that is greater than the diameter of the middle portion of the orifice.

Various embodiments include a controller that is structured to implement one or more of the methods described above.

In yet another embodiment of the present disclosure, an apparatus is provided comprising a controller including at least one processor and memory, a guide assembly coupled to the controller, and an electrode coupled to the guide assembly and configured to discharge one or more voltage sparks toward a workpiece. The memory contains instructions that when executed by the processor causes at least one of: the guide assembly to rotate the electrode and advance the electrode toward an alignment point by a first distance; the electrode to produce one or more sparks having a first voltage characteristic wherein the sparks are directed toward the alignment point of the workpiece: the electrode to produce one or more sparks having a second voltage characteristic wherein the sparks are directed toward the alignment point of the workpiece; and the controller to adjust one or more operational parameters of the electrode and the guide assembly to advance the electrode toward the alignment point by a second distance. Additionally or alternatively, the memory can contain instructions that when executed by the processor causes formation of at least a portion of an orifice comprising a first flow area and a second flow area wherein the first flow area is greater than the second flow area.

The memory can also contain instructions that when executed by the processor causes at least one of: the controller to adjust one or more operational parameters of the electrode and the guide assembly to advance the electrode toward the alignment point by a third distance; and the controller to adjust one or more operational parameters of the electrode and the guide assembly to advance the electrode toward the alignment point by a fourth distance. Additionally or alternatively, the memory can contain instructions that when executed by the processor causes a formation of at least a second portion of the orifice comprising a third flow area and a fourth flow area wherein the fourth flow area is greater than the third flow area.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

DETAILED DESCRIPTION OF EMBODIMENTS

The embodiments disclosed herein are not intended to be exhaustive or to limit the disclosure to the precise forms disclosed in the following detailed description. Rather, the embodiments were chosen and described so that others skilled in the art may utilize their teachings.

Figure 1:
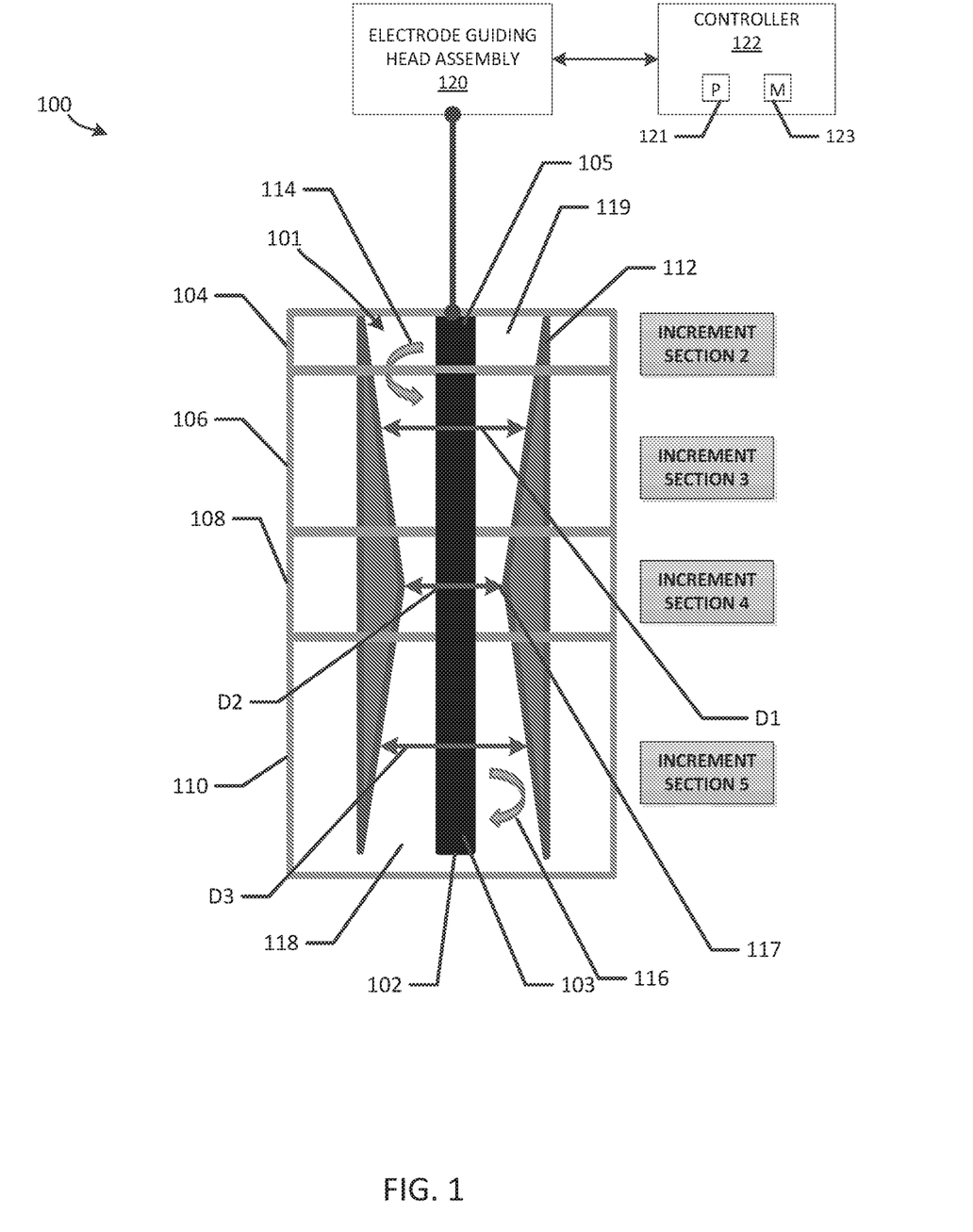
FIG. 1 is a diagram representation of an injection orifice system according to an embodiment of the present disclosure.

Referring now to FIG. 1, a spray-hole/injection orifice system 100 according to an embodiment of the present disclosure is shown. The following description is merely exemplary in nature and is in no way intended to limit the disclosure, its application, or uses. As used herein, the phrase at least one of A, B, or C should be construed to mean a logical (A or B or C), using a non-exclusive logical OR. It should be understood that steps within a method may be executed in a different order without altering the principles of the present disclosure. As used herein, the term controller may refer to an Application Specific Integrated Circuit (ASIC), an electronic circuit, a processor (shared, dedicated, or group) and memory that execute one or more software or firmware programs, a combinational logic circuit, and/or other suitable components that provide the described functionality.

As shown in the illustrative embodiment of FIG. 1, spray-hole/injection orifice system 100 (hereinafter "system 100") generally includes injection orifice 101, electrode 102, controller 122, electrode guiding head assembly 120 (hereinafter "guide assembly 120") and fuel injector nozzle 112. As various embodiments of the present disclosure are described herein fuel injector nozzle 112 may be referred to as nozzle 112 and/or workpiece 112. In the embodiment of FIG. 1, guide assembly 120 of system 100 may be mechanically and electrically coupled to electrode 102 such that guide assembly 120 may exert mechanical and positional control of electrode 102 to allow a user to achieve the desired placement and positional alignment of electrode 102 relative to workpiece 112. Electrode 102 includes a first end 103 directed toward workpiece 112 and a second end 105 coupled to guide assembly 120. In one embodiment of the present disclosure, electrode 102, guide assembly 120 and controller 122 are integrated within an exemplary electrical discharge machining system such as the Microfor FPI EDM manufactured by Posalux SA Switzerland. Electrode 102 may be any type of suitable electrode such as a hollow or solid electrode. In one embodiment, electrode 102 is a uniformly cylindrical probe, except where it tapers to a point at an end opposite from its engagement with guide assembly 120. Electrode 102 may be made of any suitable material such as graphite or metals including brass, copper, zinc, tungsten, or aluminum. In one embodiment, electrode 102 may be made of a tungsten alloy. In various other embodiments, electrode 102 may also be made of an alloy, such as, for example, copper-tungsten, silver-tungsten, low-carbon steel, and stainless steel.

Controller 122 generally includes processor 121 and memory 123. In one embodiment, controller 122 may embody a single processor 121 or multiple processors 121 that include a means for controlling operations of system 100. Numerous commercially available microprocessors may perform the functions of controller 122. It should be appreciated that controller 122 could readily embody a general machine microprocessor capable of controlling numerous machine functions. Memory 123 may be utilized for storing data such as, for example, an operating condition, design limit, and performance characteristic or specification of system 100. In particular, controller 122 may utilize memory 123 for storing one or more predetermined variables or thresholds. Various other known circuits may be associated with controller 122, including power supply circuitry, signal-conditioning circuitry, solenoid driver circuitry, communication circuitry, and other appropriate circuitry. Controller 122 may be in communication with the guide assembly 120 of system 100. Therefore, controller 122 may control a linear advancement of electrode 102 toward nozzle 112. Controller 122 may also apply a particular charge (i.e. polarity) to each of electrode 102 and workpiece 112.

The illustrative embodiment of FIG. 1 is a diagram representation of an injection orifice 101 of system 100 according to an embodiment of the present disclosure. In the embodiment of FIG. 1 orifice 101 is a representative orifice generally disposed within a nozzle portion of an exemplary fuel injector used to inject high pressure fuel through orifice 101 into a cylinder of an internal combustion engine. Orifice 101 may generally be formed within a wall region of an exemplary nozzle such as nozzle 112 wherein the wall region includes a predefined thickness. The wall thickness may be divided into one or more thickness regions or increments. In one embodiment, the wall thickness may be divided into 4 or fewer regions while in one or more alternative embodiments the wall thickness may be divided into 4 or more regions/increments. The illustrative embodiment of FIG. 1 further includes fuel flow inlet 118, fuel flow outlet 119, second increment 104, third increment 106, fourth increment 108, fifth increment 110, first diameter D1, second diameter D2, third diameter D3, electrode rotation direction 114 and electrode rotation direction 116. Orifice 101 may be described as generally including two sections wherein flow inlet 118 corresponds to a first/inlet section and flow outlet 119 corresponds to a second/outlet section. Hence, flow inlet 118 may also be referred to as inlet section 118 and flow outlet 119 may also be referred to as outlet section 119. As described in further detail in the disclosed embodiment of FIG. 2, orifice 101 is comprised of a positive tapered hole in inlet section 118, a negative tapered hole in outlet section 119, and a middle section 117 intermediate inlet section 118 and outlet section 119. Diameter D1 corresponds to a particular area of outlet section 119, diameter D3 corresponds to a particular area of inlet section 118, and diameter D2 corresponds to middle section 117.

As is generally known in the art, EDM may be utilized to manufacture fuel injector nozzles having spray-holes or injection orifices that vary in design and general appearance. One or more exemplary methods of utilizing EDM to produce injection spray-holes is disclosed in U.S. Pat. No. 7,572,997 B2 to Chen-Chun Kao, the disclosure of which is hereby incorporated by reference in its entirety herein. Currently, the prevailing spray-hole design used by most fuel injector manufacturers includes tapered or conical spray holes. However, as noted above, venturi shaped spray-holes are the current focus of fuel injector designers and the present disclosure provides a method to produce fuel injector nozzles having one or more injection orifices comprising a venturi and/or converge-diverge spray-hole design. A venturi shaped spray-hole/injection orifice may be defined as a spray-hole having a tapering constriction in the middle which causes an increase in the flow velocity of fluid flowing through the hole and a corresponding decrease in fluid pressure. The method of the present disclosure is generally comprised of an electrode alignment process and an EDM process or program. The alignment process of electrode 102 includes deviation from conventional or prior art EDM electrode alignment theory. The EDM program includes adjusting or modifying one or more operational parameters of electrode 102 at each increment section as guide assembly 120 advances electrode 102 through the wall thickness of nozzle 112 and the corresponding increment sections.

Figures 2A, 2B, 2C:
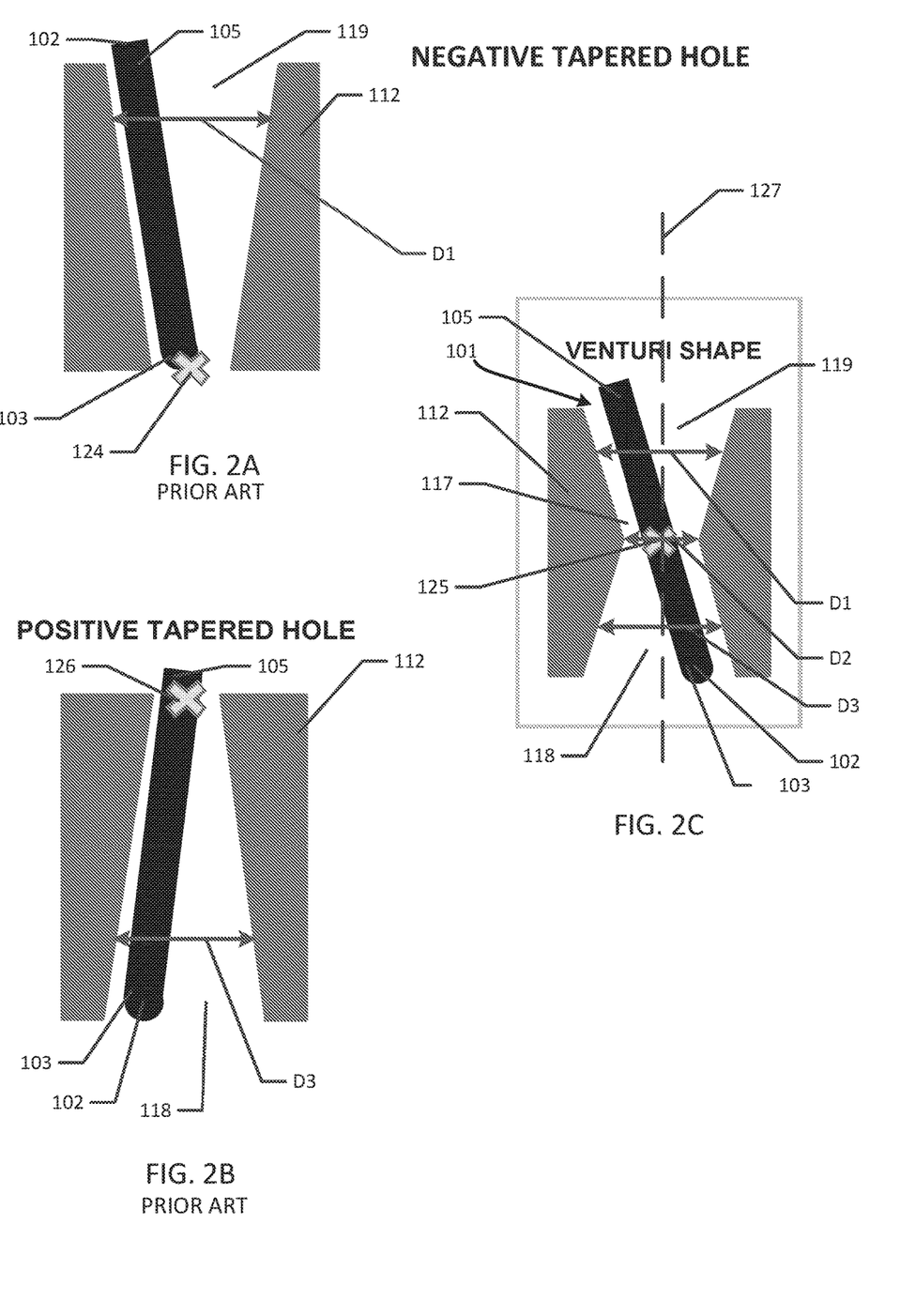
FIGS. 2A-2C show diagram representations of one or more injection orifices according to an embodiment of the present disclosure.

FIGS. 2A-2C show diagram representations of one or more injection orifices according to an embodiment of the present disclosure. Under conventional EDM alignment processes electrode 102 may be aligned at a point of rotation near the surface of an exemplary work piece. The illustrative embodiment of FIG. 2A shows a diagram representation of a negative tapered spray-hole manufactured utilizing an exemplary EDM process that uses a conventional alignment point 124 near a first surface of nozzle 112 located on the interior portion of nozzle 112. Likewise, the illustrative embodiment of FIG. 2B shows a diagram representation of a positive tapered spray-hole manufactured utilizing an exemplary EDM process that uses a conventional alignment point 126 near a second surface of nozzle 112 located on the exterior of nozzle 112. FIG. 2C. shows a diagram representation of a venturi shaped spray-hole manufactured according to a method of the present disclosure which utilizes alignment point 125 located generally at central longitudinal axis 127 of middle section 117. In one embodiment, the venturi shaped spray-hole is comprised of inlet section 118 having a positive taper and outlet section 119 having a negative taper. In one aspect of this embodiment, a correction factor may be used to determine the approximate location of alignment point 125. An exemplary correction factor may be added to an initial, preliminary or theoretical alignment point of electrode 102 to mitigate electrode wear during drilling. In one embodiment, a correction factor of .79 millimeters (mm) may be added to a theoretical alignment point of 1.01 mm wherein 1.01 mm includes a 0.5 mm distance from guide assembly 120 and a 0.51 mm may be approximately half-way through the wall thickness of workpiece/nozzle 112. In various embodiments of the present disclosure, the correction factor may be different depending on electrode size (e.g. length & diameter) and workpiece/nozzle wall thickness. As shown in the illustrative embodiment of FIG. 2C, flow inlet section 118 has a diameter D3 that is greater than diameter D2 of middle orifice section 117 and flow outlet section 119 has a diameter D1 that is also greater than diameter D2 of middle section 117. In one embodiment, diameter D1 and diameter D3 are substantially the same. Accordingly, as electrode 102 advances longitudinally downwardly through workpiece 112, the venturi shaped design of FIG. 2C is created resulting in an injection orifice 101 having an increased diameter in flow inlet 118 and flow outlet 119 and a decreased diameter near the center/middle of the injection orifice of work piece 112.

Figure 3:
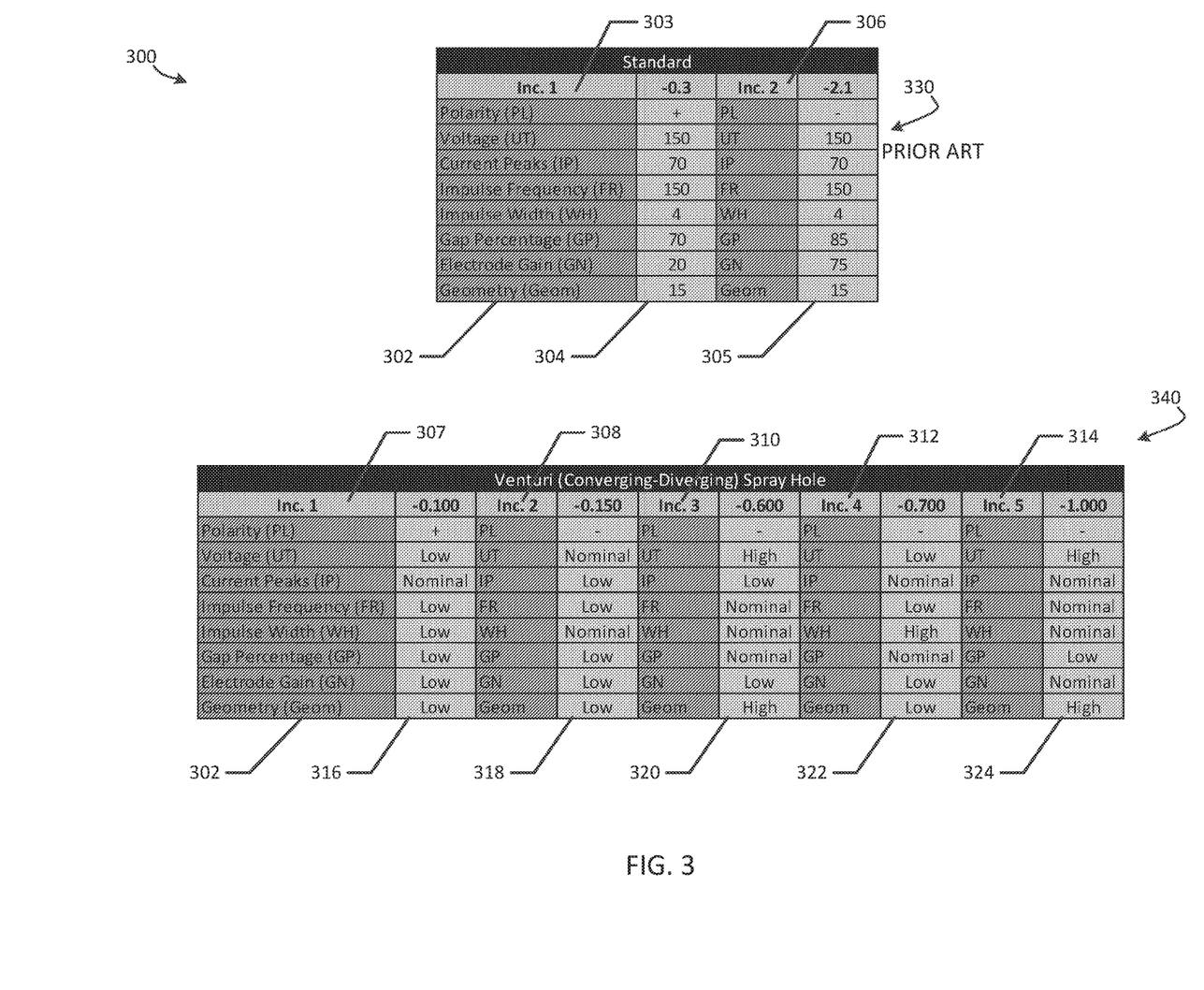
FIG. 3 shows an exemplary EDM program for manufacturing an injection orifice according to an embodiment of the present disclosure.
Figure 4A:
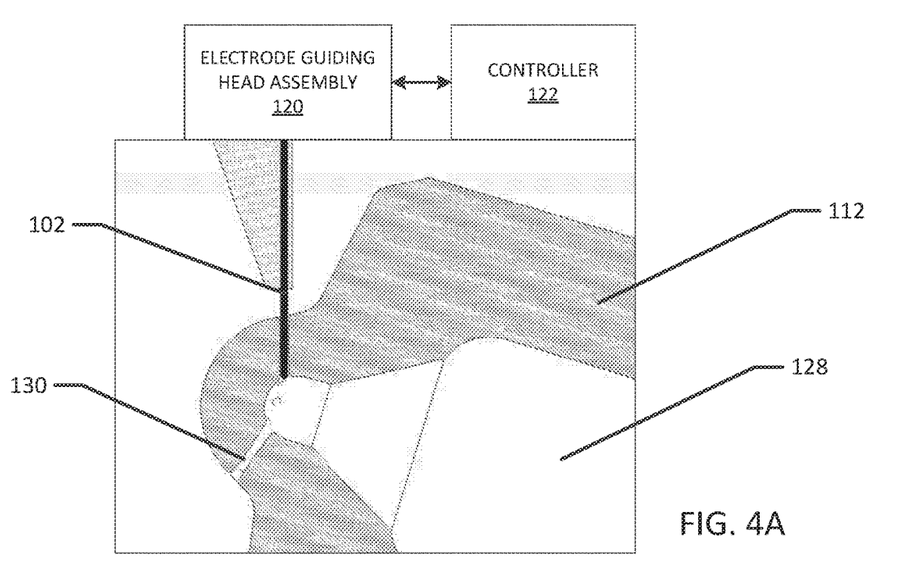
FIGS. 4A and 4B shows the injection orifice system of FIG. 1 interfacing with an exemplary fuel injector nozzle according to an embodiment of the present disclosure.

FIG. 3 shows an exemplary EDM program 300 for manufacturing a venturi injection orifice according to an embodiment of the present disclosure. EDM program 300 includes various parameter values and adjustment indicators that may be used in adjusting or modifying one or more operational parameters of electrode 102 at each increment section. EDM program 300 generally includes prior art EDM sub-program 330 and venturi EDM sub-program 340. EDM program 300 further includes electrode parameters 302, first conventional increment ("CI") 303, second CI 306, parameter values 304, and parameter values 305. Program 300 also includes first venturi increment ("VI") 307 having corresponding adjustment indicator 316, second VI 308 having corresponding adjustment indicator 318, third VI 310 having corresponding adjustment indicator 320, fourth VI 312 having corresponding adjustment indicator 322, and fifth VI 314 having corresponding adjustment indicator 324. In one embodiment of the present disclosure, as guide assembly 120 advances electrode 102 through the wall thickness of nozzle 112 electrode parameters 302 may be modified or adjusted at each increment section or drilling stage of the EDM process. In various embodiments, a user may adjust electrode parameters 302 as shown in EDM sub-program 340 to manufacture a venturi spray-hole such as the exemplary venturi injection orifice of FIG. 2C discussed above and the venturi injection orifice of FIG. 4 and FIG. 5 described herein below. In one embodiment, electrode parameters 302 and the adjustment indicators that correspond to each venturi increment may be stored within memory 123 of controller 122. In this embodiment, processor 121 of controller 122 may access memory 123 and execute an exemplary software program which causes controller 122 to provide one or more control signals to guide assembly 120. The control signals received by guide assembly 120 then cause electrode 102 to initiate a spray-hole drilling sequence resulting in the manufacturing of an exemplary venturi shaped injection orifice.

In one embodiment, during execution of the software program, controller 102 may vary the amount of power conveyed through guide assembly 120 to move electrode 102 according to the methods disclosed herein to create one or more venturi spray-holes in workpiece 112. Controller 122 may also modify the polarity of charge to electrode 102 and workpiece 112 such that, for example, electrode 102 is positively charged and workpiece 112 is negatively charged. Controller 122 may also provide one or more control signals to increase an applied voltage and/or current to electrode 102 and/or workpiece 112 in accordance with various parameter values of program 330 or adjustment indicators of program 340. In various embodiments of the present disclosure, electrode parameters 302 include at least one: 1) increment depth (Inc.); 2) electrode polarity (PL); 3) applied electrode voltage (UT) measured in volts direct current (VDC); 4) number/quantity of current peaks (IP); 5) impulse frequency (FR) corresponding to the frequency in kilohertz that electrode 102 discharges voltage sparks which impact the material of nozzle 112; 6) impulse width (WH) corresponding to the duration between the discharge voltage sparks; 7) gap percentage (GP) corresponding to the percent of voltage sparks that impact the material of workpiece 112; 8) electrode gain (GN) corresponding to the speed at which electrode 102 advances toward workpiece 112; or 9) electrode geometry (Geom) corresponding to an amount by which electrode 102 is off center or angled relative to central longitudinally axis 127.

According to the methods of the present disclosure, accurate alignment of electrode 102 at particular protruding depths such as alignment point 125, advancement of electrode 102 through the increment sections shown in FIG. 1, and adjustment of the one or more operational parameters as shown in sub-program 340 all cooperate to produce venturi shaped spray holes with flexibility for the user to locate the "necking" as well as the positive or negative taper of spray-holes. As noted above, prior art EDM processes can only create positive or negative taper for spray-hole designs as shown in FIGS. 2A and 2B. However, the present disclosure provides a method of executing an EDM program which includes adding increment sections and changing, at each increment section, several parameters within the EDM program to control hole/orifice size throughout the wall region of workpiece 112. In one embodiment the method provides for changing, for example, the increment depth, the polarity, voltage, current peaks, impulse frequency, pulse width, discharge gap, and electrode/servo gain at the respective increments to either increase or decrease the spray-hole diameter. In one embodiment, the method further provides for matching the increment sections to a parameter (e.g. Geom) that pneumatically controls the distance electrode 102 rotates at an angle relative to central longitudinal axis 127. In yet another embodiment, the position of electrode first end 103, in relation to workpiece 112, is also controlled throughout the EDM process/program to assure process consistency.

As noted above, the alignment process of the present disclosure includes deviation from conventional EDM electrode alignment theory and allows for achieving the venturi shaped spray-hole described herein. The prior art EDM theory of creating a tapered/conical spray hole is currently applied in the diesel fuel system industry. In prior art alignment practice, the point of rotation (or pivot point) of the electrode is usually set at the exterior surface of the exemplary fuel injector nozzle. Having the point of rotation at the exterior surface provides a point for the electrode to begin burning through the nozzle and as the electrode rotates and moves longitudinally downward a tapered hole is thereby created. According to the present disclosure, to create a venturi shaped spray-hole, the point of rotation of electrode 102 is moved along central longitudinal axis 127 and head assembly 120 is configured accordingly to facilitate alignment of electrode 102 at alignment point 125. In one embodiment, the distance from which the point of rotation is moved relative to the conventional alignment position is based on the wall thickness of work piece 112 and an exemplary conversion factor. As noted above, in one embodiment, to create a venturi shaped spray hole the point of rotation may theoretically be set at alignment point 125 corresponding to the longitudinal axis 127 at middle section 117 of the wall thickness of work piece 112.

In addition to the unique alignment procedure described above, producing the venturi shaped spray hole of the present disclosure also involves use of several increment sections having unique parameter values in each increment. In one embodiment, each increment may be defined as a sub-process of the drilling EDM sub-program 340, wherein each increment is distinguished from other increments by, for example, a specific drilling depth and associated EDM parameter values. In one embodiment, system 100 may execute EDM sub-program 330, advance electrode 102 to an increment depth of 0.3 micron and initially configure electrode parameters 302 according to parameter values 304. In this embodiment, controller 122 provides control signals to guide assembly 120 and electrode 102 to do the following:

1) advance electrode 102 to an increment depth of 0.3 micron; 2) set the polarity of the electrical charge to positive; 3) set a voltage output of electrode 102 to 150 VDC; 4) set a number of current peaks (IP) of electrode 102 to 70; 5) set an impulse frequency of electrode 102 to 150 KHz; 6) set an impulse width of electrode 102 to 4 microseconds; 7) set a gap percentage to 70%; 8) set a gain of electrode 102 to 20; and 9) set an electrode geometry to 15 micron. In this embodiment, system 100 may then execute EDM sub-program 330, advance electrode 102 to an increment depth of 2.1 micron and configure electrode parameters 302 according to parameter values 305. In this embodiment, controller 122 provides control signals to guide assembly 120 and electrode 102 to do the following: 1) advance electrode 102 to an increment depth of 2.1 mm: 2) set the polarity of the electrical charge to negative: 3) set a gap percentage to 85%; and 4) set a gain of electrode 102 to 75.

In the illustrative embodiment of FIG. 3, EDM sub-program 340 for producing an exemplary venturi spray-hole has five increments. In this embodiment, first venturi increment 307 may be used to condition electrode 102 and prepare it for the electrical discharge machining process and may also be referred to as electrode dressing. In first venturi increment 307 polarity of the electrical charge applied to electrode 102 is switched to positive, which causes the tip at first end 103 of electrode 102 to be worn or burned away. As a result, when electrode 102 begins penetrating through work piece 112, the shape of the tip of electrode 102 will be flat and uniform. During the machining process the tip of electrode 102 is worn on one side as it rotates around at least a first portion of an exemplary spray-hole to be created within nozzle 112. Therefore, it is necessary to dress electrode 102 by removing the worn tip. Electrode dressing should be performed to ensure repeatability of the process and to ensure dimensional consistency of the venturi spray-hole that is eventually created.

First venturi increment 307 further includes setting the values of electrode parameters 302 according to adjustment indicators 316. As noted above, system 100 may execute EDM sub-program 330 and initially configure electrode parameters 302 according to parameter values 304 and then configure electrode parameters 302 according to parameter values 305. Hence, setting the values of electrode parameters 302 according to adjustment indicators 316 include at least one of: lowering ("Low") the parameter value used in second CI 306, increasing ("High") the parameter value used in second CI 306, or allowing the parameter value used in second CI 306 to remain unchanged ("Nominal"). For example, at first increment 307, electrode 102 will be advanced toward workpiece 112 by 0.1 mm, the polarity of the electrical charge applied to electrode 102 will be switched to positive, the voltage output of electrode 102 will be set to a value of lower than 150 VDC, the number of current peaks will remain at the nominal value of 70, the impulse frequency of electrode 102 will be set to a value of lower than 150 KHz, the impulse width of electrode 102 will be set to a value of lower than 4 microseconds, the gap percentage will be set to a value of lower than 85%, the gain of electrode 102 will be set to a value of lower than 75, and the electrode geometry will be set to a value of lower than 15.

Referring again to the embodiment of FIG. 3, upon completion of executing the drilling process according to the parameter values of first venturi increment 307, the method embodied by sub-program 340 proceeds to second venturi increment 308. Venturi increment 308 therefore includes advancing electrode 102 toward workpiece 112 by a distance of 0.150 mm and setting parameter values 302 according to adjustment indicators 318. Increment 308 is used to continue electrode 102 burning or machining through workpiece 112 and adjustment of parameter values 302 during increment 308 is based on the settled/determined values of increment 307 upon implementation of adjustment indicators 316. As such, venturi increment 308 has a relatively low voltage, frequency, and servo gain in order to ease the effort of electrode 102 starting to machine the material of nozzle 112 to create at least a first portion of an exemplary venturi spray-hole. The distance by which electrode 102 is advanced longitudinally downwardly in increment 308 is relatively short compared to the other increments of sub-program 340.

Upon completion of executing the drilling process according to the parameter values of second venturi increment 308, the method embodied by sub-program 340 proceeds to third venturi increment 310. Venturi increment 310 therefore includes advancing electrode 102 toward workpiece 112 by a distance of 0.600 mm and setting parameter values 302 according to adjustment indicators 320. Venturi increment 310 is used to enlarge the flow outlet diameter of outlet section 119 of an exemplary venturi spray-hole. Additionally, adjustment of parameter values 302 during increment 310 is based on the settled/determined values of increment 308 upon implementation of adjustment indicators 318. As such, during venturi increment 310 there is an obvious increase in electrode voltage and impulse frequency. However, in order to avoid electrode 102 from burning through the material of nozzle 112 too quickly, the servo gain and discharge gap (the distance between electrode and work piece) are relatively consistent with the other increments of sub-program 340.

Upon completion of executing the drilling process according to the parameter values of third venturi increment 310, the method embodied by sub-program 340 proceeds to fourth venturi increment 312. Venturi increment 312 therefore includes advancing electrode 102 toward workpiece 112 by a distance of 0.700 mm and setting parameter values 302 according to adjustment indicators 322. Venturi increment 312 is used to keep diameter D2 at this drilling depth (where the point of rotation and alignment point 125 are located) as small as possible to maintain a well-defined venturi shape needed to produce an exemplary venturi spray-hole. Additionally, adjustment of parameter values 302 during increment 312 is based on the settled/determined values of increment 310 upon implementation of adjustment indicators 320. As such, during venturi increment 312 there is an obvious decrease in electrode voltage, impulse frequency, and servo gain in this increment. However, the discharge gap is increased to prevent electrode 102 from touching workpiece 112 (causing a potential short circuit) and/or to prevent generation of arcing. Without adjusting electrode parameters 302 according to increment 312, electrode 102 would stall out and not continue burning the desired venturi spray-hole design. Moreover, if the process takes too long in increment 312, the result will be a straight injector spray-hole rather than the desired venturi injection orifice design.

Upon completion of executing the drilling process according to the parameter values of fourth venturi increment 312, the method embodied by sub-program 340 proceeds to fifth venturi increment 314. Venturi increment 314 therefore includes advancing electrode 102 toward workpiece 112 by a distance of 1.000 mm and setting parameter values 302 according to adjustment indicators 324. Venturi increment 314 is used to enlarge the flow inlet diameter D3 of inlet section 118 in order to produce the desired venturi spray-hole design. Additionally, adjustment of parameter values 302 during increment 314 is based on the settled/determined values of increment 312 upon implementation of adjustment indicators 322. As such, during venturi increment 314 there is an obvious increase in electrode voltage and impulse frequency. However, in order to prevent electrode 102 from burning through the material of nozzle 112 too quickly, the servo gain and discharge gap are relatively consistent with the other increments of sub-program 340. In various embodiments, parameter values may vary slightly depending on the type of electrode used to accomplish the drilling process.

Figure 4B:
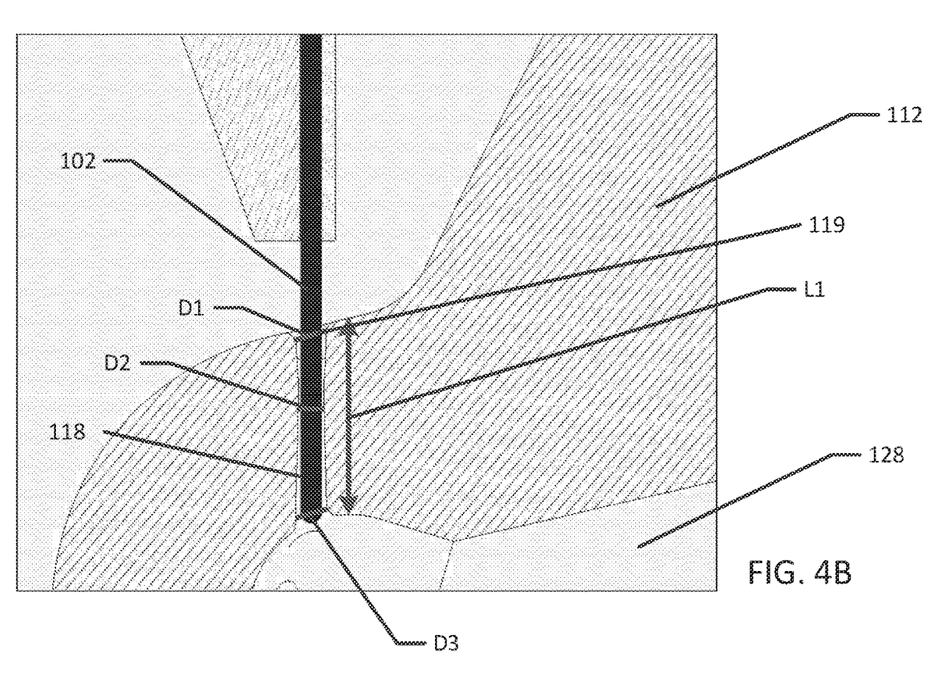
Figure 5A:
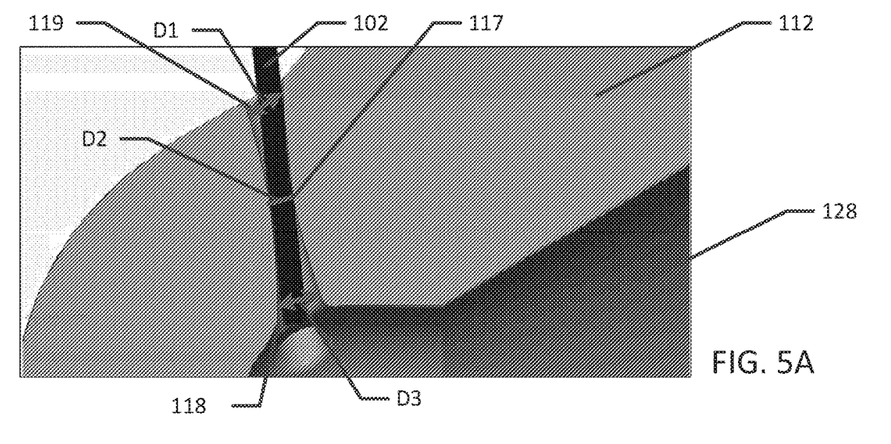
FIGS. 5A and 5B shows an exemplary electrode interfacing with an exemplary fuel injector nozzle according to an embodiment of the present disclosure.
Figure 5B:
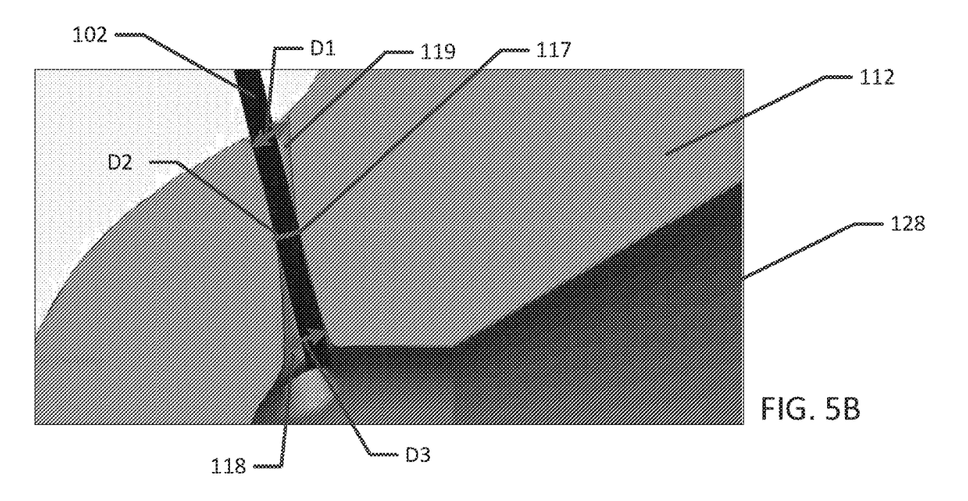

FIGS. 4A, 4B, 5A and 5B show system 100 of FIG. 1, including electrode 102, interfacing with an exemplary fuel injector nozzle 112 according to an embodiment of the present disclosure. The illustrative embodiment of FIG. 2C generally corresponds to the nozzle line drawing view of FIG. 4B as well as the nozzle model view of FIGS. 5A and 5B. As such, FIGS. 4A, 4B, 5A and 5B generally include fuel injector nozzle 112 and nozzle internal fuel flow area 128. As shown in FIG. 4B, 5A, and 5B, outlet section 119 has diameter D1, middle section 117 has diameter D2, and inlet section 118 has diameter D3. FIG. 4B illustrates venturi orifice length L1.

Figure 6:
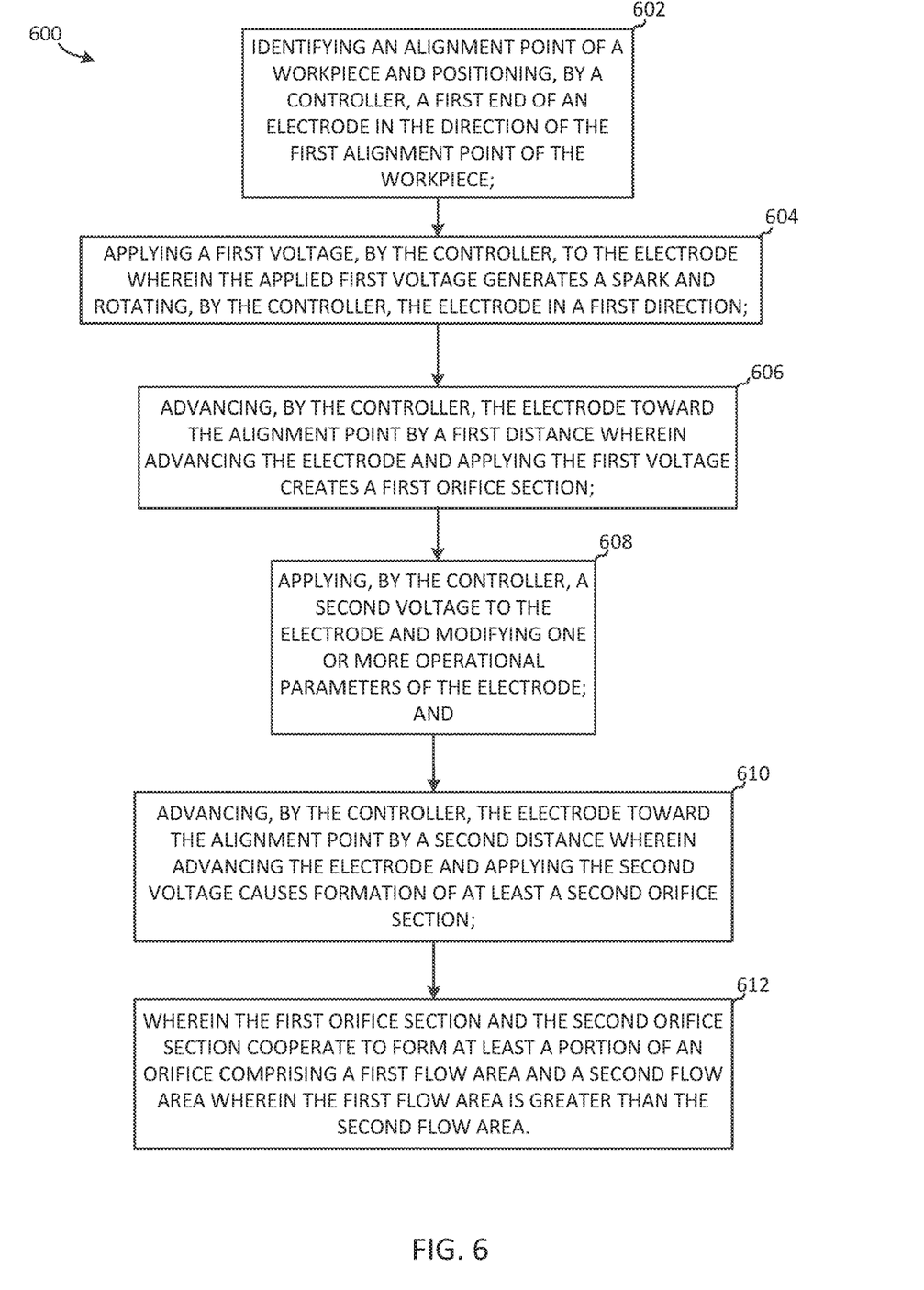
FIG. 6 is a flow diagram of an exemplary method of operating the injection orifice system of FIG. 1 according to an embodiment of the present disclosure.

FIG. 6 is a flow diagram of an exemplary method 600 of operating injection orifice system 100 of FIG. 1 according to an embodiment of the present disclosure. As such, a description of method 600 may reference the aforementioned components and other features of system100. Method 600 begins at block 602 and includes identifying an alignment point of workpiece 112 and positioning, by controller 122, first end 103 of electrode 102 in the direction of the alignment point of workpiece 112. In one embodiment, the alignment point corresponds to alignment point 125. Method 600 then proceeds to block 604 and includes applying a first voltage, by controller 120, to electrode 102 wherein the applied first voltage generates a spark. Block 604 further includes, rotating, by controller 120, electrode 102 in a first direction. At block 606, method 600 includes advancing, by controller 120, electrode 102 toward the alignment point by a first distance wherein advancing electrode 102 and applying the first voltage creates a first orifice section. In one embodiment, the first orifice section may be outlet section 119. Block 608 of method 600 includes applying, by controller 120, a second voltage to electrode 102 and modifying/adjusting one or more operational parameters of electrode 102. At block 610, method 600 includes advancing, by controller 120, electrode 102 toward the alignment point by a second distance wherein advancing electrode 102 and applying the second voltage causes formation of at least a second orifice section. In one embodiment, the second orifice section may be inlet section 118. At block 612, the method provides that the first orifice section and the second orifice section cooperate to form at least a portion of an orifice comprising a first flow area and a second flow area wherein the first flow area is greater than the second flow area. In one embodiment, the first flow area may correspond to at least one of inlet section 118 or outlet section 119 while the second flow area may correspond to middle section 117.

The above detailed description of the invention and the examples described therein have been presented for the purposes of illustration and description only and not by limitation. It is therefore contemplated that the present invention cover any and all modifications, variations, or equivalents that fall within the spirit and scope of the basic underlying principles disclosed above and claimed herein. As such, in the foregoing specification, specific embodiments of the present disclosure have been described. However, one of ordinary skill in the art will appreciate that various modifications and changes can be made without departing from the scope of the disclosure as set forth in the claims below. Accordingly, the specification and figures are to be regarded in an illustrative, rather than a restrictive, sense. The benefits, advantages, solutions to problems, and any element(s) that may cause any benefit, advantage, or solution to occur or become more pronounced are not to be construed as critical, required, or essential features or elements of any or all the claims.

The invention claimed is:

1. A method of operating an electrical discharge machining (EDM) system including an electrode electronically controllable to form an orifice in a workpiece, the method comprising:
   positioning a first end of an electrode in a direction of an alignment point located along a longitudinal axis intersecting the workpiece;
   creating a first orifice section in the workpiece including applying a voltage to the electrode effective to generate a spark, rotating the electrode at an angle relative to the longitudinal axis, and moving the electrode relative to the alignment point by a first distance; and
   after creating the first orifice section, creating a second orifice section in the workpiece including adjusting the voltage applied to the electrode, adjusting the angle of rotation of the electrode relative to the longitudinal axis, and moving the electrode relative to the alignment point by a second distance;
   wherein a first flow area of the first orifice section is greater than a second flow area of the first orifice section.

2. The method of claim 1, comprising:
   after creating the second orifice section, creating a third orifice section in the workpiece including second adjusting the voltage applied to the electrode, second adjusting the angle of rotation of the electrode relative to the longitudinal axis, and moving the electrode relative to the alignment point by a third distance; and
   after creating the third orifice section, creating a fourth orifice section in the workpiece including third adjusting the voltage applied to the electrode, third adjusting the angle of rotation of the electrode relative to the longitudinal axis, and moving the electrode relative to the alignment point by a fourth distance.

3. The method of claim 2, wherein the first orifice section, the second orifice section, the third orifice section, and the fourth orifice section comprise portions of a venturi shape.

4. The method of claim 2, wherein the first orifice section and the second orifice section comprise at least a portion of an outlet section of the orifice, the third orifice section comprises at least a portion of a middle section of the orifice, and the fourth orifice section comprises at least a portion of an inlet section of the orifice.

5. The method of claim 4, wherein a diameter of the outlet section of the orifice has a diameter greater than a diameter of the middle section of the orifice, and a diameter of the inlet section of the orifice has a diameter that is greater than the diameter of the middle portion of the orifice.

6. The method of claim 1, wherein the workpiece comprises at least a first portion of a fuel injector nozzle and the orifice is an injection orifice of the fuel injector nozzle.

7. The method of claim 1, comprising: identifying the alignment point of the workpiece, the alignment point being located along a central longitudinal axis of the workpiece.

8. A system for electrical discharge machining (EDM) a workpiece, the system comprising:

an electrode operatively coupled with and moveable by a guide assembly; and an electronic controller operatively coupled with the electrode and the guide assembly, the electronic controller being configured to:

position a first end of an electrode in a direction of an alignment point located along a longitudinal axis intersecting the workpiece;

apply a voltage to the electrode effective to generate a spark, rotate the electrode at an angle relative to the longitudinal axis, and move the electrode relative to the alignment point by a first distance effective to create a first orifice section in the workpiece; and adjust the voltage applied to the electrode, adjust the angle of rotation of the electrode relative to the longitudinal axis, and move the electrode relative to the alignment point by a second distance effective to create a second orifice section in the workpiece;

wherein a first flow area of the first orifice section is greater than a second flow area of the first orifice section.

9. The system of claim 8, wherein the electronic controller is configured to:

second adjust the voltage applied to the electrode, second adjust the angle of rotation of the electrode relative to the longitudinal axis, and move the electrode relative to the alignment point by a third distance effective to create a third orifice section in the workpiece; and third adjust the voltage applied to the electrode, third adjust the angle of rotation of the electrode relative to the longitudinal axis, and move the electrode relative to the alignment point by a fourth distance effective to create a fourth orifice section in the workpiece.

10. The system of claim 9, wherein the first orifice section, the second orifice section, the third orifice section, and the fourth orifice section comprise portions of a venturi shape.

11. The system of claim 9, wherein the first orifice section and the second orifice section comprise at least a portion of an outlet section of the orifice, the third orifice section comprises at least a portion of a middle section of the orifice, and the fourth orifice section comprises at least a portion of an inlet section of the orifice.

12. The system of claim 11, wherein a diameter of the outlet section of the orifice has a diameter greater than a diameter of the middle section of the orifice, and a diameter of the inlet section of the orifice has a diameter that is greater than the diameter of the middle portion of the orifice.

13. The system of claim 8, further comprising the workpiece.

14. The system of claim 13, wherein the workpiece comprises at least a first portion of a fuel injector nozzle and the orifice is an injection orifice of the fuel injector nozzle.

15. The system of claim 8, wherein the electronic controller is configured to identify the alignment point of the workpiece, the alignment point being located along a central longitudinal axis of the workpiece.

16. An apparatus comprising:

a nontransitory memory medium configured to store instructions for operating an electrical discharge machining (EDM) system including an electrode operatively coupled with and positionable by a guide assembly, the instructions being executable by a controller to control the electrode and the guide assembly to:

position a first end of an electrode in a direction of an alignment point located along a longitudinal axis intersecting the workpiece;

apply a voltage to the electrode effective to generate a spark, rotate the electrode at an angle relative to the longitudinal axis, and move the electrode relative to the alignment point by a first distance effective to create a first orifice section in the workpiece; and modify the voltage applied to the electrode, modify the angle of rotation of the electrode relative to the longitudinal axis, and move the electrode relative to the alignment point by a second distance effective to create a second orifice section in the workpiece;

wherein a first flow area of the first orifice section is greater than a second flow area of the first orifice section.

17. The apparatus of claim 16, wherein the instructions are executable by the controller to:

second modify the voltage applied to the electrode, second modify the angle of rotation of the electrode relative to the longitudinal axis, and move the electrode relative to the alignment point by a third distance effective to create a third orifice section in the workpiece; and third modify the voltage applied to the electrode, third modify the angle of rotation of the electrode relative to the longitudinal axis, and move the electrode relative to the alignment point by a fourth distance effective to create a fourth orifice section in the workpiece.

18. The apparatus of claim 17, wherein the first orifice section, the second orifice section, the third orifice section, and the fourth orifice section comprise portions of a venturi shape.

19. The apparatus of claim 16, further comprising the controller.

20. The apparatus of claim 16, further comprising the EDM system.

* * * * *